(12) United States Patent
Stadelbauer et al.

(10) Patent No.: US 8,740,045 B2
(45) Date of Patent: Jun. 3, 2014

(54) MANUFACTURING METHOD FOR MICROVALVES

(75) Inventors: Birgit Stadelbauer, Ludwigshafen (DE); Sven Scheufler, Niedernhall (DE)

(73) Assignee: Buerkert Werke GmbH, Ingelfingen (DE)

( * ) Notice: Subject to any disclaimer, the term of this patent is extended or adjusted under 35 U.S.C. 154(b) by 0 days.

(21) Appl. No.: 13/569,244

(22) Filed: Aug. 8, 2012

(65) Prior Publication Data

US 2013/0206319 A1    Aug. 15, 2013

(30) Foreign Application Priority Data

Aug. 10, 2011 (DE) .................... 10 2011 109 944

(51) Int. Cl.
*B23K 31/02* (2006.01)
*B23K 20/10* (2006.01)
*F16K 31/02* (2006.01)

(52) U.S. Cl.
USPC ............... 228/160; 228/110.1; 251/129.01

(58) Field of Classification Search
USPC .................................................. 251/129.01
See application file for complete search history.

(56) References Cited

U.S. PATENT DOCUMENTS

| | | | | |
|---|---|---|---|---|
| 3,058,203 | A * | 10/1962 | Mack et al. | 29/890.042 |
| 5,142,781 | A * | 9/1992 | Mettner et al. | 29/890.124 |
| 5,924,674 | A | 7/1999 | Hahn et al. | |
| 6,305,418 | B1 * | 10/2001 | Schulze | 137/625.23 |
| 6,576,026 | B1 * | 6/2003 | Shiraishi et al. | 29/25.03 |
| 6,619,533 | B1 * | 9/2003 | Hootman et al. | 228/112.1 |
| 6,677,054 | B1 * | 1/2004 | Hermann et al. | 428/636 |
| 6,748,975 | B2 * | 6/2004 | Hartshorne et al. | 137/625.46 |
| 6,793,831 | B1 * | 9/2004 | Paul et al. | 216/36 |
| 6,988,301 | B2 * | 1/2006 | Takeuchi et al. | 29/25.35 |
| 7,565,744 | B2 * | 7/2009 | Matsui et al. | 29/890.131 |
| 7,861,388 | B2 * | 1/2011 | Takeuchi et al. | 29/25.35 |
| 8,020,750 | B2 * | 9/2011 | Crockett et al. | 228/193 |
| 8,293,053 | B2 * | 10/2012 | Young et al. | 156/160 |
| 2002/0195579 | A1 * | 12/2002 | Johnson | 251/11 |
| 2006/0180223 | A1 | 8/2006 | Broyer et al. | |
| 2006/0215155 | A1 | 9/2006 | Weber | |
| 2009/0072009 | A1 * | 3/2009 | Crockett et al. | 228/190 |
| 2009/0095363 | A1 * | 4/2009 | Nakakubo et al. | 137/843 |
| 2011/0114869 | A1 | 5/2011 | Schaeffer et al. | |
| 2012/0301903 | A1 * | 11/2012 | Putnam et al. | 435/7.92 |

OTHER PUBLICATIONS

German Search Report dated May 11, 2012.

* cited by examiner

*Primary Examiner* — Kiley Stoner
*Assistant Examiner* — Carlos Gamino
(74) *Attorney, Agent, or Firm* — Carlson, Gaskey & Olds, PC

(57) ABSTRACT

Microvalves are composed in a stacked design of a plurality of components comprising at least two housing parts, a membrane clamped between the two housing parts, and an actuator. A plurality of identical components are respectively arranged on a common, individual support plate and positioned next to each other in one plane. The manufacturing method for the microvalves comprises the steps of: providing the support plates with respectively identical components positioned in a grid pattern each having with the same grid dimension, inserting the support plates on top of one another in a retaining device, connecting at least some of the stacked components arranged on the support plates on an outer edge delimiting the components by a joining method, separating the microvalves by punching, and punching the membrane from a membrane support plate during connection of the components.

15 Claims, 2 Drawing Sheets

MANUFACTURING METHOD FOR MICROVALVES

RELATED APPLICATION

This application claims priority to German Application No. 10 2011 109 944.5, which was filed Aug. 10, 2011.

TECHNICAL FIELD

The invention relates to a manufacturing method for microvalves.

BACKGROUND OF THE INVENTION

In manufacturing microvalves, the provision of the individual components with an appropriately tight tolerance range, from which the microvalve is formed already constitutes a challenge. Individual manufacturing technologies have been developed therefor.

A further challenge is to establish a production process suitable for industry for assembling these components and for the exact positioning thereof with respect to each other in a series production. A high process reliability is to be ensured, and as few manual steps as possible should be necessary.

Though several concepts for the structure of microvalves are already known, the realization of industrial manufacturing methods of such microvalves is so far problematic.

SUMMARY OF THE INVENTION

The invention provides a feasible manufacturing method for microvalves in series production.

In a manufacturing method for microvalves, each microvalve is composed in a stacked design of a plurality of components comprising at least two housing parts, a membrane clamped between two housing parts, and an actuator. A plurality of identical components are respectively arranged on a common, individual support plate and positioned next to each other in one plane. The manufacturing method comprises the steps of: a) providing the support plates with respectively identical components positioned in a grid pattern with each having the same grid dimension, b) inserting the support plates on top of one another in a retaining device, c) connecting at least some of the stacked components arranged on the support plates on an outer edge delimiting the components by a joining method, d) separating the microvalves by punching, and e) punching the membrane from a membrane support plate during connection of the components.

A number of microvalves with components being arranged on common plates are produced simultaneously by this method. In the method, the components are arranged on a plurality of support plates such that when these support plates are stacked one on top of the other, the components are simultaneously positioned in a desired manner with respect to each other. The mounting of the microvalves is thus considerably simplified. All support plates carrying components should have the same grid dimension, i.e. each blocked field of the virtual matrix generated having a component has the same dimension, so that components for the same microvalve are already aligned to each other within the plane of its plate.

The support plates are so large that an easy handling without a special tool is possible.

As the membranes are also provided on a common support plate, they can be structured in a simple manner by the shape plate of the tool. The membrane can for example be planar or also be provided with a curvature, as a result of which it can be adapted to the geometry of chosen valve seat contours in an optimal way.

For the membrane, a material usual for membranes, in particular an elastomer can be chosen. Prior to or after the joining operation for connecting the stacked components, potentially disturbing elastomer rests present on the outer edge delimiting these housing parts may be removed in a simple manner.

The microvalve manufactured using the method also comprises, if necessary, at least one spring element for prestressing the actuator. It is however also possible to produce valves without the spring element, for example in actuators in the form of shape-memory elements.

If the membrane is made of a plastic material and is for example a plastic film, the membrane rests between the housing parts and can then be connected with the housing parts in the joining operation.

Ultrasonic welding can be used as the joining method. With this method, all stacked components can be connected with each other in a single step. The connecting of the components with each other can of course also be realized in succession in several successive steps.

Alternatively, other known joining methods can also be used, such as bonding methods or laser welding. Using laser welding, it must be taken into account that the components to be connected must at least partially be made of transparent or translucent materials.

In a manufacturing method, a first housing part comprises a cutting prolongation which points axially towards the membrane support plate and by which the membrane is punched from the membrane support plate. The cutting prolongation ensures that the punched membrane has a defined geometry in its edge area. The membrane need not be inserted as a single part in a housing part and oriented using a complicated mounting process. Possible small tolerance differences are furthermore compensated directly, because in the manufacturing method, each housing part gets its "own," exactly matching membrane.

The first housing part can be configured as a guiding plate which rests against the membrane and through which a portion of the actuator or a transmitting element cooperating with the actuator extends. The actuator or the transmitting element cooperating with the actuator is positioned in an optimal way in the microvalve by the guiding plate, so that the force provided by the actuator can be used with losses that are as low as possible.

It is however also possible to produce microvalves without the guiding plate. The first housing part is then configured as a cover, and the actuator is positioned on the membrane by a recess in the cover which receives the actuator. The transmitting element cooperating with the actuator is also optional. In all embodiments, the membrane is arranged between the at least two housing parts and is punched during the connecting operation.

A second housing part adjoining the membrane support plate can have a recess, in particular a surrounding shear groove arranged on the outer edge delimiting the second housing part.

The cutting prolongation engages this shear groove when the housing parts are connected. When the two housing parts are pressed together along with the cutting prolongation and the shear groove, the membrane present between these housing parts is pressed into the shear groove by the cutting prolongation. The membrane is thus expanded in this area and slightly thinner, which favors the punching process.

Due to the elasticity of the membrane, the latter moves slightly away from the cutting prolongation after punching so that membrane material, such as elastomer for example, which could impede the joining process is no longer present between the cutting prolongation and the shear groove.

Furthermore, the surrounding cutting prolongation can have a further function: in case ultrasonic welding is chosen as joining method, the prolongation is configured as an energy direction means or disposer. It is therefore possible to avoid a further housing contour, as a result of which costs in the microvalve manufacturing can be saved, and the room required by the microvalve is furthermore smaller.

It is however also possible to provide two separate contours in the housing parts, namely the cutting prolongation for punching the membrane, and the energy direction disposer for the ultrasonic welding process.

Valve ducts are arranged in one of the housing parts and project therethrough. The housing parts can be manufactured along with the valve ducts in a single operation, for example using an injection molding method, by hot stamping, or by injection compression molding. Several identical parts are then manufactured next to each other in one plane, for example in rows, on the support plates. With this method, it is possible to produce the desired miniaturized parts in reproducible high quality with small tolerances.

The support plates are configured thinner in areas between the components. This facilitates later the punching operation when the microvalves are separated. In other applications in which several microvalves are required in blocks and the punching step is therefore omitted, the areas configured thinner can, for example, be used to guide cables required by the microvalves for their electrical contacting.

Micro-coils, piezo drives, or shape-memory alloy elements are, for example, used as actuators for the microvalves. These actuators are also manufactured on support plates.

The actuators are produced in a structured, in particular metallic support plate by laser cutting, punching, and/or etching. It is also possible to provide the actuator as a stack composed of several actuator layers, such as foils.

In a further manufacturing method, a component group is first punched from part of the stacked support plates in an intermediate step before the stacked components are connected with each other. This is advantageous if this component group is partially or completely made of a metallic material and could disturb the joining operation. The component group is then punched such that it does not rest on the outer edge delimiting the other components.

The component group can be punched by a punching tool having a plurality of punches arranged on a support plate with the same grid dimension as the components on their support plates. It is thus possible to punch all component groups at the same time. It is however also possible to punch the component groups one after the other using a single punch.

This intermediate step permits the microvalve to be composed of components each having the same extent in the microvalve, and of the component group having a smaller extent.

The actuator is typically made of a metallic material so that this component group comprises the actuator.

In the microvalve, one housing part is usually configured as a cover. The cover is also provided on a support plate These and other features of the present invention can be best understood from the following specification and drawings, of which the following is a brief description.

DETAILED DESCRIPTION

Figure 2:
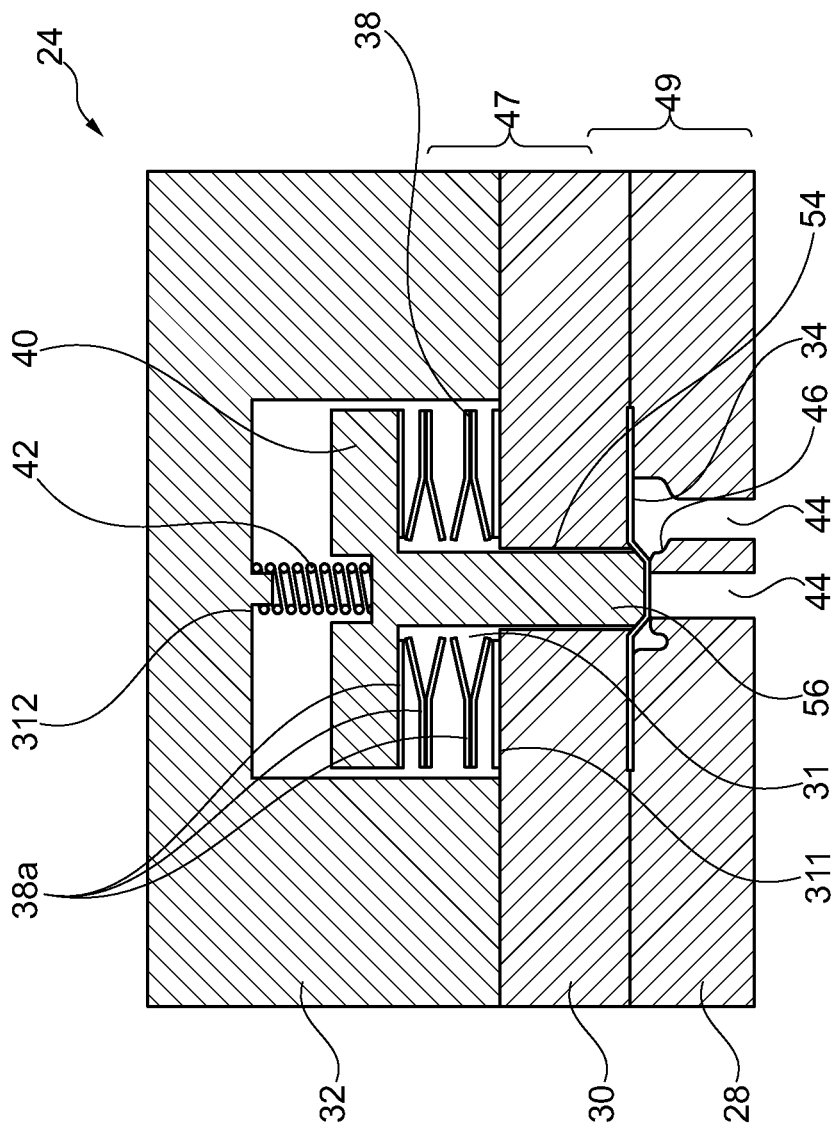
FIG. 2 shows a sectional view through a microvalve manufactured in accordance with the method according to the invention.

The structure of a microvalve manufactured according to the manufacturing method of the invention described below is represented in FIG. 2 by way of example and is described here in advance for a better understanding. It is of course also possible to simply apply the manufacturing method according to the invention to the manufacture of other microvalves.

FIG. 2 shows a sectional view of a microvalve 24 which has a drive housing 47 composed of housing parts 30, 32, and a fluid housing 49 composed of housing parts 28, 30 along with the valve seat 46. The drive housing 47 is configured in two parts. A membrane 34 is arranged between the drive housing 47 and the fluid housing 49. The drive housing 47 has a chamber 31 which is formed in the housing part 32 and which is open to the fluid housing via a passage 54 in the housing part 30. A spring 42, an actuator 38, and a transmitting element 40 are arranged in the chamber 31.

The actuator 38 is arranged such that one face is fixed to a rest 311 of the housing 30 and its face opposite thereto is fixed to the transmitting element 40.

On the opposite housing face, one end of the spring 42 abuts on a rest 312, and its second end abuts on the transmitting element 40. The spring 42 and the actuator 38 are thus arranged and firmly positioned on opposite faces of the transmitting element 40.

In FIG. 2, the actuator 38 is configured as a shape-memory alloy element having a plurality of foils 38a which are stacked one on top of the other and are connected with each other on their outer periphery and on an inner edge delimiting a center passage. A center passage for receiving the transmitting element 40 is arranged in the actuator 38.

In the illustrated state in which no current is supplied, the spring 42 is tensioned and presses the transmitting element 40 onto the membrane 34 and the valve seat 46, as a result of which the latter is closed. When current is supplied, the actuator 38 expands axially against the spring force, the transmitting element 40 being thus lifted off from the membrane 34 and releasing the valve seat 46.

Figure 1:
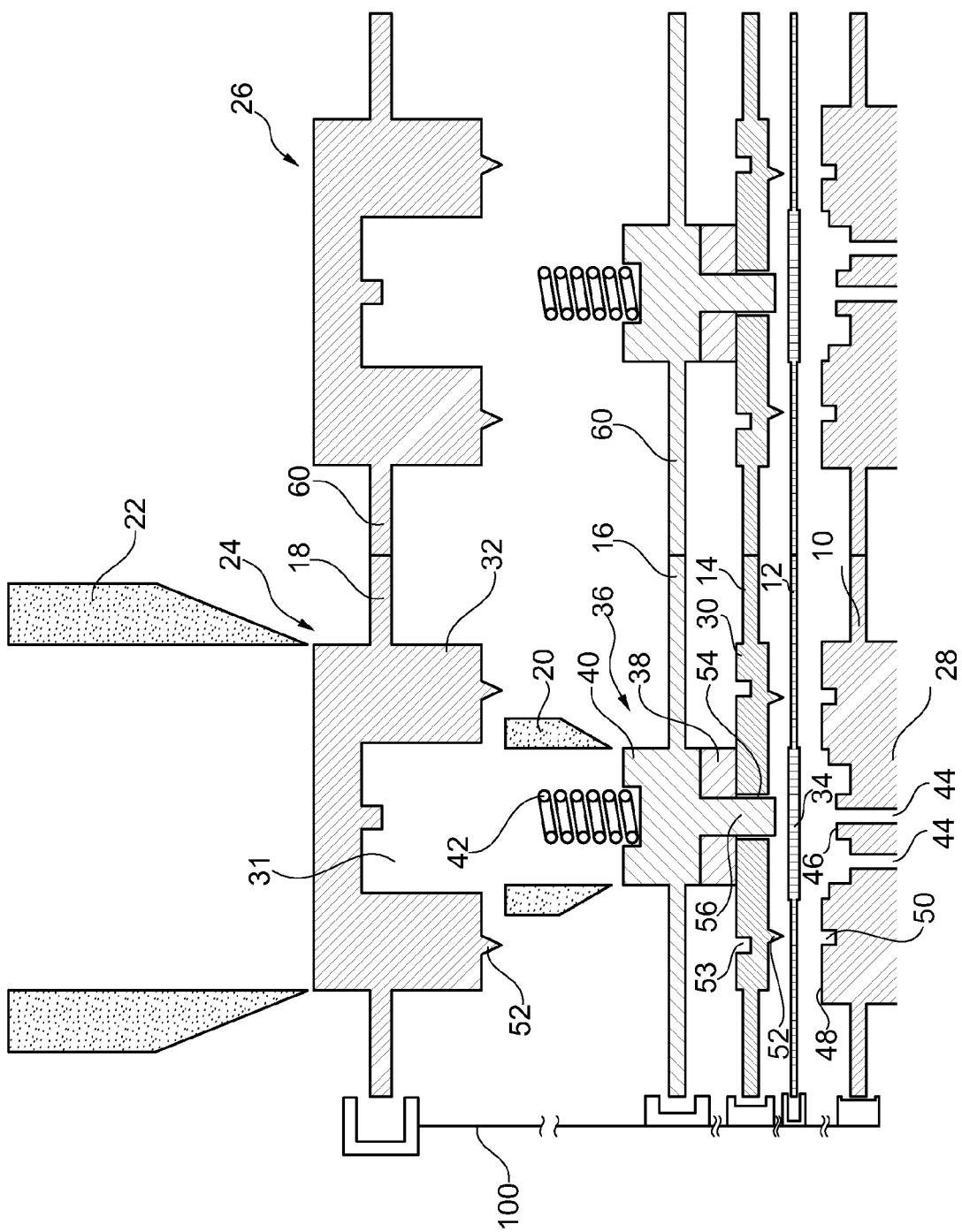
FIG. 1 shows a cross section through stacked support plates for the manufacture of two microvalves according to the method of the invention.

FIG. 1 illustrates in cross-section support plates 10, 12, 14, 16, 18 in an arrangement in layers and stacked on top of one another, and schematically two punching tools 20 and 22. Each support plate 10 to 18 forms a plane having several identical components mounted to the support plate per support plate.

By way of example, two respective identical components per support plate are shown arranged next to each other on the support plates 10, 12, 14, 16, 18, which in an assembled state form two identical microvalves 24, 26. Each support plate can of course contain more than two, but the same number of identical components which are all arranged next to each other in a lattice or matrix-like manner by using in the same grid dimension (i.e. the distance between components is constant). The components form identical microvalves when they are stacked and connected with each other.

The housing parts 28, 30 and 32 are arranged in or on the support plates 10, 14, 18, the membrane 34 is arranged in/on the support plate 12, and the component group 36 comprising the electrically actuatable actuator 38, the mechanical transmitting element 40 moving the membrane 34, and a spring 42 for prestressing the transmitting element 40 is arranged in/on the support plate 16. Preferably, the housing parts 28 to 32 form an integral part of the respective support plate, just as the membrane 34, so that the support plates 10, 12, 16, 18 are preferably profiled.

The first housing parts 28 are arranged in or on the support plate 10, and the second housing parts 30 are arranged in or on the support plate 14. Fluid ducts 44 serving in the microvalve 24, 26 as a fluid inlet and outlet project through each housing part 28. The valve seat 46 is arranged on or is integrally formed with one of the fluid ducts 44.

The microvalves 24, 26 are configured in a cylindrical manner. However, they can also have a different geometry, for example a cuboidal geometry.

According to FIG. 1, an outer edge 48 having a surrounding groove 50 is present in the second housing part 28 on a face adjacent to the next support plate 12, and a surrounding cutting prolongation 52, preferably having a V-shaped cross-section, is present in the first housing part 30 in the support plate 14 opposite the groove 50. The membrane 34 is clamped on the support plate 12 between the first and the second housing parts 28, 30.

In a manufacturing method, the cutting prolongation 52 has a double function: it punches the membrane 34 from the support plate 12 and serves as an energy direction disposer in the joining operation, in case ultrasonic welding is used therefor. This is why in an identical manner, an energy direction disposer is provided on the housing part 32 and opposite thereto, a groove 53 is provided on the housing part 30.

The first housing part 30 is configured as a guiding plate in which a passage 54 is arranged through which a prolongation 56 of the transmitting element 40 projects.

The support plate 16 along with the transmitting elements 40 is optional and not necessary for a functioning microvalve. In the microvalve, the transmitting element 40 serves to transmit the force produced by the actuator 38, as a result of which the membrane 34 undergoes an axial moving force. However, the actuator 38 can also be positioned directly on the membrane 34 and cooperate therewith. In this embodiment, the second housing part 30 is also omitted. The housing part 32 then closes as a cover for the stack from which the microvalve 24, 26 is formed.

The actuator 38 can also be arranged above or below the housing part 30, as viewed in the axial direction. In case the actuator 38 is arranged below the transmitting element 40, as illustrated in FIGS. 1 and 2, the actuator 38 has a passage for the transmitting element 40 which prolongs the passage 54 in the housing part 30.

The third housing part 32 has a chamber 31 for receiving the component group 36 and forms the cover for the microvalve 24, 26.

Each support plate 10, 12, 14, 16, 18 comprises between its components of which the microvalve 24, 26 is composed thin areas 60 with little material which facilitate the punching step or steps and only serve to couple the components.

For manufacturing the microvalve 24, 26 shown in FIG. 2, the support plates 10, 12, 14 and 16 on which a plurality of identical components is respectively arranged, are first stacked one on top of the other in a retaining device 100. The prolongations 56 of the transmitting elements 40 project through the passages 54 in the guiding plate 30 and the passages in the actuators 38 prolonging these passages.

As discussed above, the support plates are provided with respectively identical components positioned in a grid or lattice-like pattern with each having the same grid dimension (i.e. the distance between components is constant).

In an intermediate step, the transmitting elements 40 and the actuators 38 are punched from their support plate 16 by punches 20. One respective spring 42 is positioned on the transmitting elements 40 by a guiding aid provided there, for example a recess receiving the spring 42, but the transmitting element could also be provided with guiding pins.

The punches 20 are removed, and the support plate 18 is inserted into the retaining device 100, the housing parts 32 each receiving in their chambers 31 a component group 36 composed of the actuator 38, the transmitting element 40, and the spring 42. Guiding aids for the springs 42 are also provided in the chambers 31.

When all inserted support plates are pressed one on top of the other, the membranes 34 are punched between the housing parts 28, 30. The cutting prolongations 52 engage the grooves 50 on the outer edges 48.

All housing parts that are positioned one on top of the other are connected with each other by ultrasonic welding. This is realized in one process step.

The microvalves 24, 26 can be inserted connected to a block, or are separated by punches 22.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for manufacturing of microvalves, each microvalve being composed in a stacked design of a plurality of components comprising at least two housing parts, a membrane clamped between the two housing parts, and an actuator,
a plurality of identical components being respectively arranged on a common, individual support plate and positioned next to each other in one plane,
the manufacturing method comprising the steps of:
a) providing support plates with respectively identical components positioned in a grid pattern with each having the same grid dimension,
b) inserting the support plates on top of one another in a retaining device,
c) connecting at least some of the stacked components arranged on the support plates on an outer edge delimiting the components by a joining method forming the microvalves,
d) separating the microvalves by punching, and
e) punching the membrane from a membrane support plate during connection of the components.

2. The manufacturing method according to claim 1, wherein the components are connected to each other by ultrasonic welding.

3. The manufacturing method according to claim 1, wherein a first housing part has a cutting prolongation which points axially towards the membrane support plate and which punches the membrane from the membrane support plate.

4. The manufacturing method according to claim 3, wherein the first housing part is a guiding plate resting against the membrane and through which one of a portion of the actuator and a transmitting element cooperating with the actuator extends.

5. The manufacturing method according to claim 1, wherein, for the punching step, a second housing part adjoining the membrane support plate has a recess arranged on the outer edge delimiting the housing part.

6. The manufacturing method according to claim 3, wherein, during the punching step, the cutting prolongation engages a shear groove when the components are connected.

7. The manufacturing method according to claim 5, wherein the cutting prolongation is configured as an energy direction disposer for an ultrasonic welding process.

8. The manufacturing method according to claim 1, wherein valve ducts are arranged in at least one housing part and project through the at least one housing part.

9. The manufacturing method according to claim 1, wherein the support plates on which the housing parts are arranged are made of plastic material by one of hot stamping and injection molding.

10. The manufacturing method according to claim 1, wherein the support plates are configured thinner in areas between the components compared with areas at the components.

11. The manufacturing method according to claim 1, wherein the actuator is configured as one of a micro-coil, a piezo element, and a shape-memory alloy element.

12. The manufacturing method according to claim 11, wherein the actuators are produced in a structured support plate by at least one of laser cutting, punching, and etching.

13. The manufacturing method according to claim 1, wherein an intermediate step is provided in which a component group is punched out from a part of the stacked support plates before the stacked components are connected with each other.

14. The manufacturing method according to claim 13, wherein the punched component group comprises the actuator.

15. The manufacturing method according to claim 1, wherein at least one of the two housing parts is configured as a cover.

* * * * *